(12) United States Patent
Chen et al.

(10) Patent No.: US 7,586,735 B2
(45) Date of Patent: Sep. 8, 2009

(54) KEY MODULE

(75) Inventors: Wei-Yu Chen, Taipei (TW); Kuei-Fang Chung, Taipei (TW)

(73) Assignee: Inventec Corporation, Taipei (TW)

( * ) Notice: Subject to any disclaimer, the term of this patent is extended or adjusted under 35 U.S.C. 154(b) by 149 days.

(21) Appl. No.: 11/645,051

(22) Filed: Dec. 26, 2006

(65) Prior Publication Data

US 2007/0268659 A1    Nov. 22, 2007

(30) Foreign Application Priority Data

May 19, 2006   (TW) ............................... 95209034 U

(51) Int. Cl.
*H01G 5/01*    (2006.01)
(52) U.S. Cl. ....................... 361/288; 200/512
(58) Field of Classification Search ............ 361/679.08, 361/679.36, 680, 288; 200/511–513, 52 R
See application file for complete search history.

(56) References Cited

U.S. PATENT DOCUMENTS

| | | | | |
|---|---|---|---|---|
| 3,806,471 A * | 4/1974 | Mitchell | ................ | 252/519.31 |
| 3,973,099 A * | 8/1976 | Morris, Sr. | .................. | 200/511 |
| 4,439,647 A * | 3/1984 | Calandrello et al. | ......... | 200/5 A |
| 4,584,444 A * | 4/1986 | Nagashima | .................. | 200/600 |
| 4,736,076 A * | 4/1988 | Mochizuki et al. | .......... | 200/600 |
| 4,814,566 A * | 3/1989 | Sigl | .......................... | 200/305 |
| 5,982,608 A * | 11/1999 | Kalnitsky et al. | ........... | 361/288 |
| 6,054,664 A * | 4/2000 | Ariga et al. | .................. | 200/512 |
| 6,067,005 A * | 5/2000 | DeVolpi | ....................... | 338/47 |
| 6,437,682 B1 * | 8/2002 | Vance | ......................... | 338/185 |

* cited by examiner

*Primary Examiner*—Michael C Zarroli
(74) *Attorney, Agent, or Firm*—Muncy, Geissler, Olds & Lowe, PLLC

(57) ABSTRACT

A key module includes a key body and an elastic element. The key body has a key surface. The elastic element, which has a side surface, is disposed around the circumference of the key body. The key surface of the key body and the side surface of the elastic element constitute a pressing surface.

14 Claims, 7 Drawing Sheets

KEY MODULE

BACKGROUND OF THE INVENTION

1. Field of Invention

The invention relates to a key module and, in particular, to a key module, which has an elastic element to construct a larger pressing surface.

2. Related Art

Everyday electronic devices, such as desktop computers, laptop computers, or PDAs (Personal Digital Assistants), usually include a number of keys for inputting specific functions. The keys are, for example, numeral keys, power keys, and reset keys.

FIG. 1 shows the structure of a conventional key. As shown in FIG. 1, the key 11 is disposed in a casing 12 of an electronic device. A key surface 111 of the key 11 is exposed from the casing 12, and the key surface 111 is protruding from a surface 121 of the casing 12. Since the key surface 111 is protruding from the surface 121, users can easily touch and press the key 11. However, the key 11 may be often unintentionally pressed. This is a very common annoyance. If the unintentionally pressed key is a specific key, such as the power key or the reset key, some irreversible events may occur. For example, the electronic device may be suddenly shut down or the configurations of the electronic device may be reset.

FIG. 2 shows a structure of another conventional key. As shown in FIG. 2, the key surface 111 of the key 11 and the surface 121 of the casing 12 are disposed at the same plane. In this case, the key surface 111 is lower, so that the events of unintentionally pressing the key 11 can be greatly reduced. However, the operation of the key 11 is much less convenient due to the fact that the area of the key surface 111 is smaller than the corresponding area of the human finger. Accordingly, the users have to use their fingertips or fingernails to poke the key surface 111 in order to properly press the key 11.

Therefore, it is an important subject of the invention to provide a key module, which can prevent unintentional depression events and make the intentional depression of the keys more convenient.

SUMMARY OF THE INVENTION

In view of the foregoing, the invention is to provide a key module that can prevent unintentional depression events and make the intentional depression of the keys more convenient.

To achieve the above, a key module of the invention includes a key body and an elastic element. The key body has a key surface, and the elastic element has a side surface. The elastic element is disposed around the circumference of the key body, and the key surface of the key body and the side surface of the elastic element constitute a pressing surface.

As mentioned above, the key module of the invention has an elastic element disposed around the key body, so that the side surface of the elastic element and the key surface of the key body can constitute a larger pressing surface. Because the pressing surface is roughly the same plane of the surface of the casing, unintentional depression events seldom occur. When the user presses the key module, the whole pressing surface including the key surface and the side surface of the elastic element are touched and pressed. Compared to the prior art, the effective pressing area is larger, so that the usage of the key module is more convenient.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
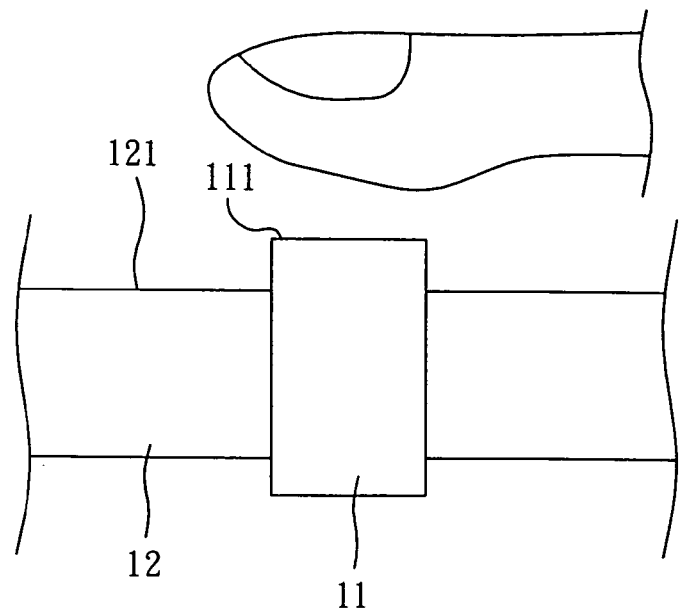
FIG. 1 is a schematic view showing a conventional key.
Figure 2:
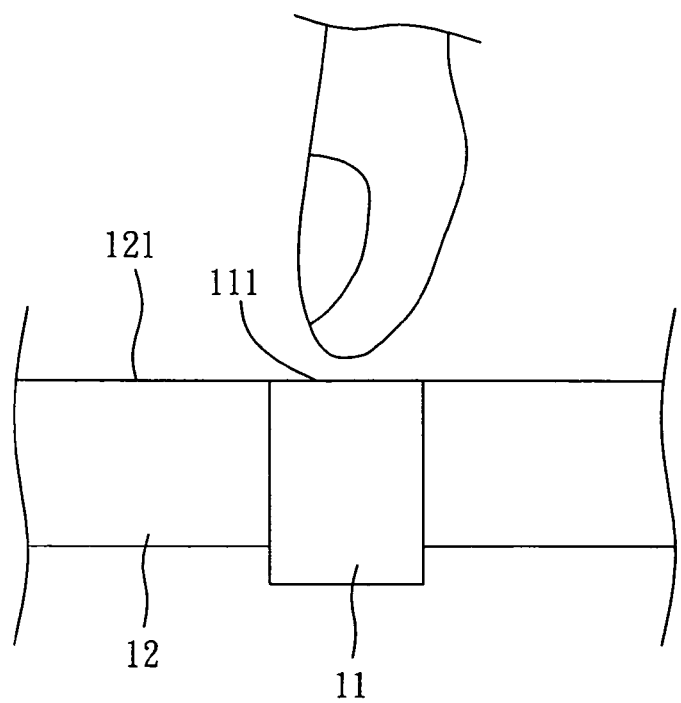
FIG. 2 is a schematic view showing another conventional key.
Figure 3:
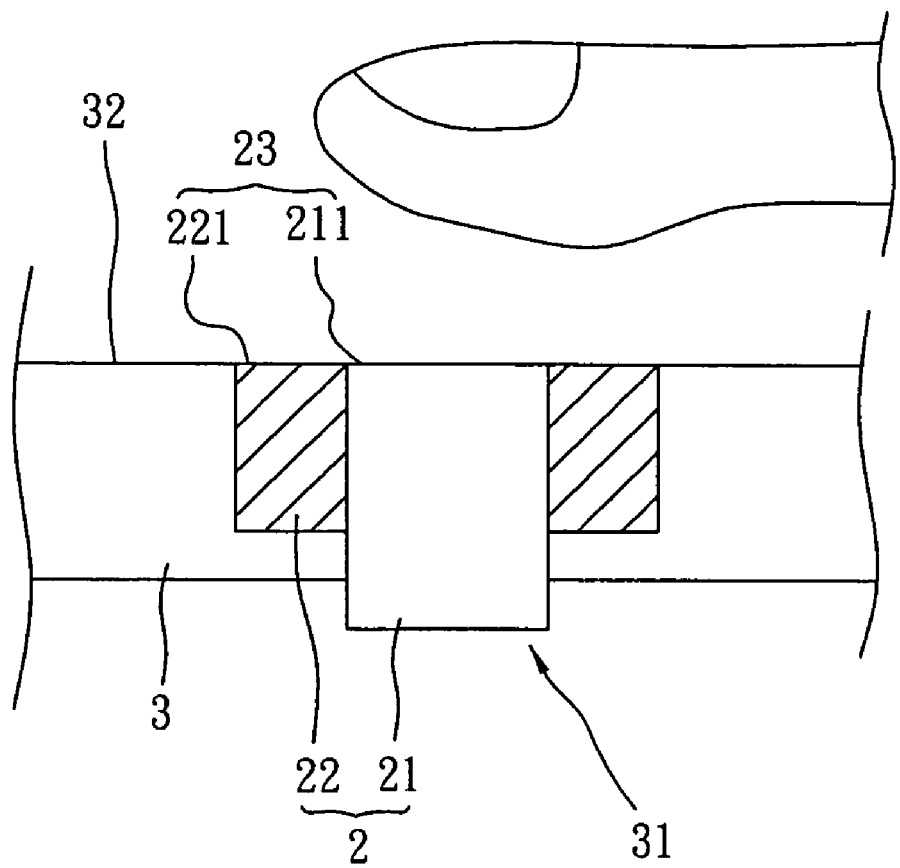
FIGS. 3 to 9 are schematic views showing a key module according to a preferred embodiment of the invention.

With reference to FIG. 3, a key module 2 according to a preferred embodiment of the invention includes a key body 21 and an elastic element 22. The key body 21 has a key surface 211. The elastic element is disposed around the circumference of the key body 21 and has a side surface 221. The key surface 211 of the key body 21 and the side surface 221 of the elastic element 22 constitute a pressing surface 23. When the user presses the key module 2, the whole pressing surface 23 including the key surface 211 and the side surface 221 are touched and pressed.

The key module 2 is applied to an electronic device including a casing 3. In the embodiment, the key module 2 is disposed in the casing 3, and the pressing surface 23 is exposed from the casing 3. The electronic device of the embodiment may be a portable electronic device such as a mobile phone, a notebook computer or a personal digital assistant (PDA).

Figure 4:
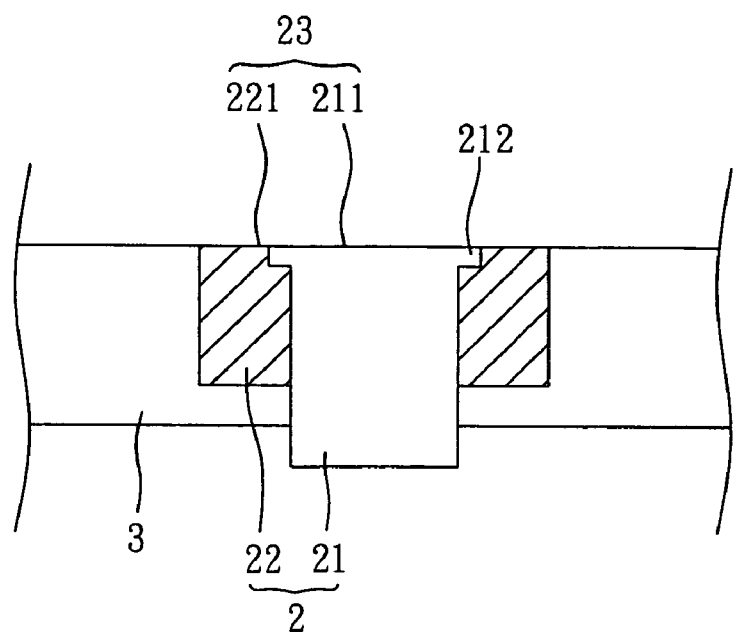
Figure 5:
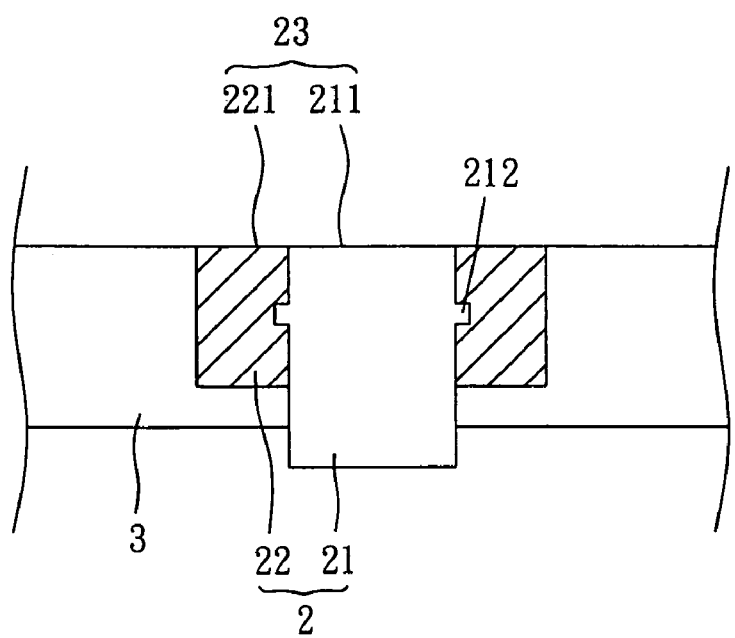
Figure 4A:
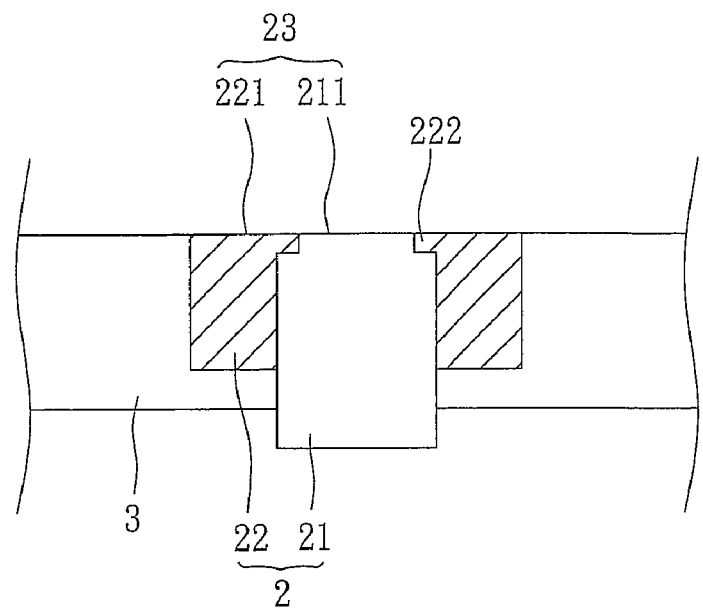
FIGS. 4A and 5A are schematic views showing a key module according to the preferred embodiment of the invention, wherein the key body has a groove and the elastic element has a protrusion.
Figure 5A:
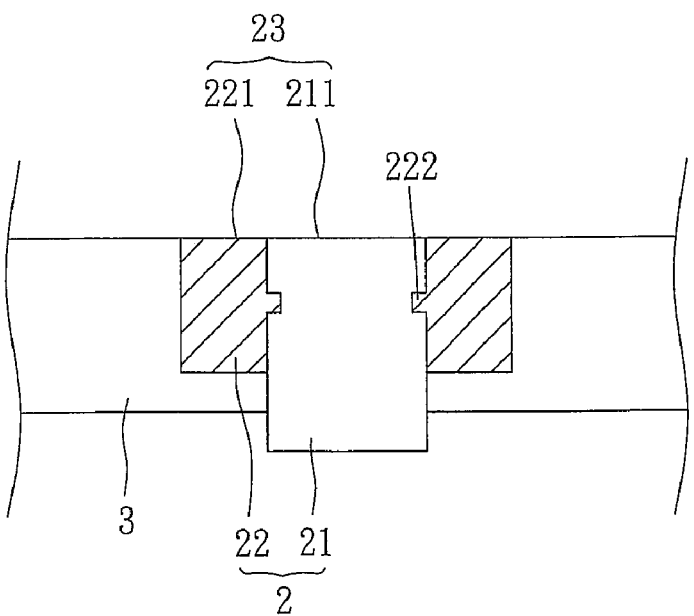

In this embodiment, the elastic element 22 is made of an elastic material, such as a polymer material. The polymer material is, for example, a crude rubber or a synthetic rubber. The key body 21 and the elastic element 22 may be connected with or disconnected from each other depending on the needs. If the key body 21 and the elastic element 22 are disconnected from each other, the gap therebetween must be limited to make the pressing action more convenient and to avoid dust passing through the gap. If the key body 21 and the elastic element 22 are connected with each other, they can be connected by adhering or wedging. As shown in FIG. 3, the key body 21 and the elastic element 22 are connected by adhering. In addition, as shown in FIG. 4 and FIG. 5, the elastic element 22 has a groove, and the key body 21 has a protrusion 212 corresponding to the groove. By wedging the protrusion 212 into the groove, the key body 21 and the elastic element 22 can be well connected. To be noted, the grooves of the elastic element 22 and the protrusions 212 of the key body 21 as shown in FIG. 4 and FIG. 5 are placed at different positions. Alternatively, as shown in FIG. 4A and FIG. 5A, the key body 21 may have a groove and the elastic element 22 may have a protrusion 222 for the connection.

Figure 6:
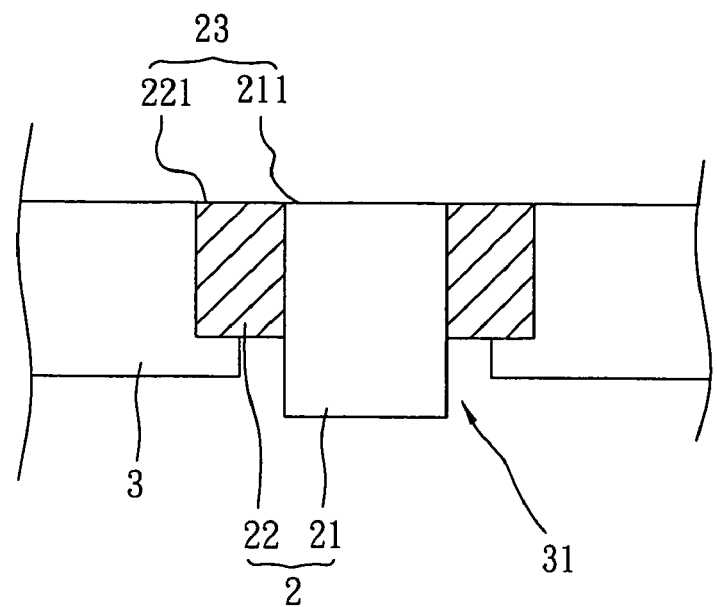
Figure 7:
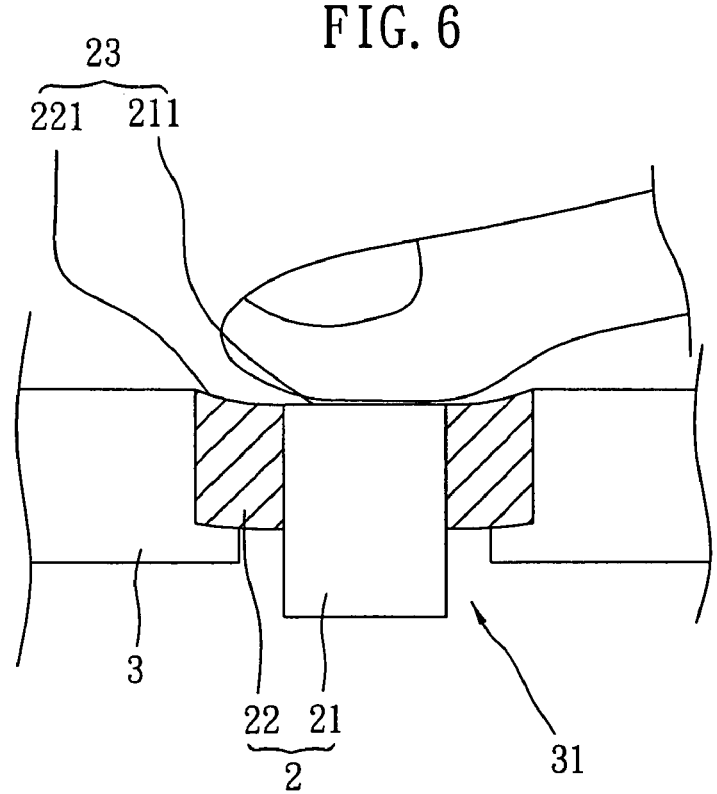

Referring to FIG. 3 again, the casing 3 has a hole 31, which allows the key body 21 to pass through, and the bottom of the elastic element 22 is totally supported by the casing 3. Alternatively, as shown in FIG. 6, the hole 31 of the casing 3 allows the key body 21 and the elastic element 22 to pass through. In this case, only a part of the elastic element 22 is supported by the casing 3. Herein, the key module 2 can be pressed as shown in FIG. 7.

Figure 8:
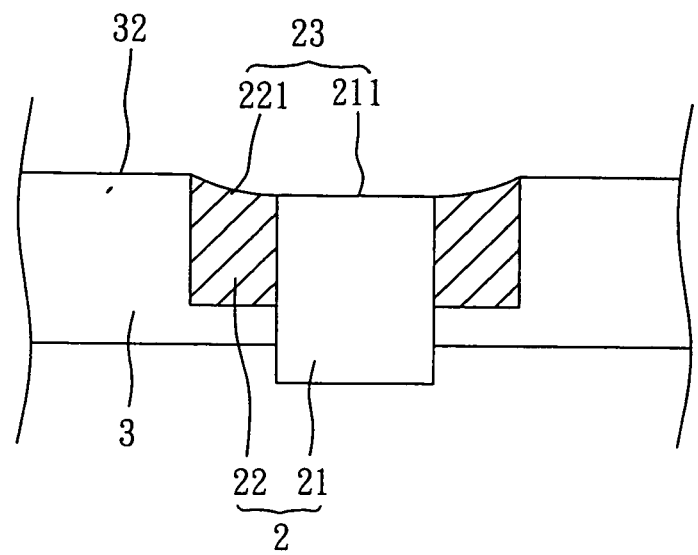
Figure 9:
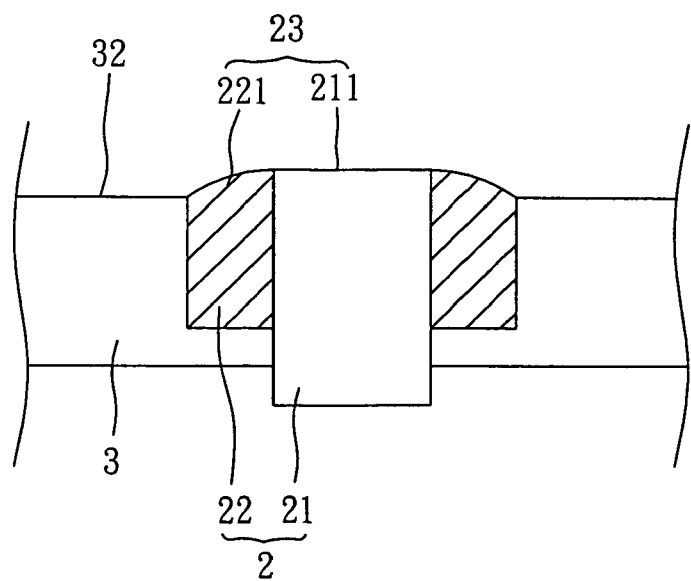

With reference to FIG. 3 again, the pressing surface 23 is a planar surface, and the pressing surface 23 and the surface 32 of the casing 3 are in the same plane. Of course, the pressing surface 23 may have different aspects. As shown in FIG. 8, the pressing surface 23 is a concave surface, and the pressing surface 23 is sunken with respect to the surface 32 of the casing 3. Otherwise, as shown in FIG. 9, the pressing surface 23 is a convex surface, and the pressing surface 23 is protruding from the surface 32 of the casing 3.

Figure 10:
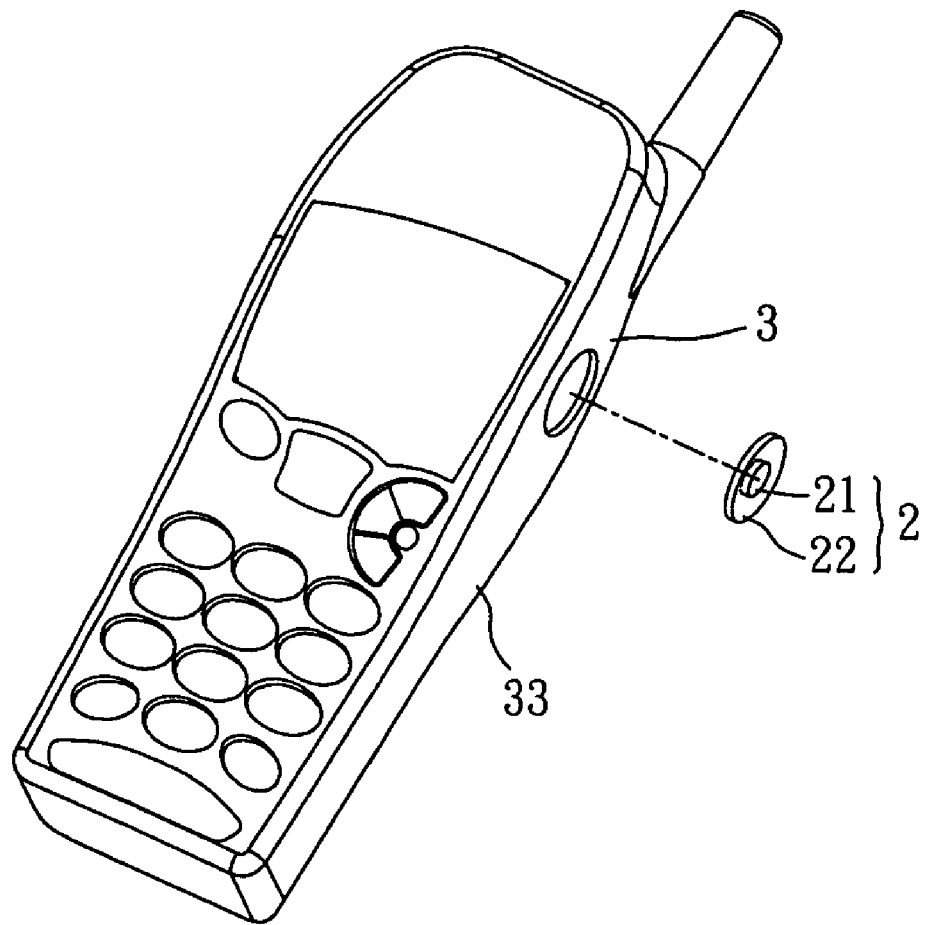
FIG. 10 is a schematic view showing an electronic device including the key module according to the embodiment of the invention.

Moreover, the key module 2 may be any kind of key module, such as a power key module or reset key module. Furthermore, the key module 2 may be located at any side of the casing 3. For example, as shown in FIG. 10, the key module 2 is located at the right side 33 of the casing 3.

In summary, the key module of the invention has an elastic element disposed around the key body, so that the side surface of the elastic element and the key surface of the key body can constitute a larger pressing surface. Because the pressing surface is roughly the same plane of the surface of the casing, unintentional depression events seldom occur. When the user presses the key module, the whole pressing surface including the key surface and the side surface of the elastic element are touched and pressed. Compared to the prior art, the effective pressing area is larger, so that the usage of the key module is more convenient.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A key module, applied to an electronic device having a casing, comprising:

a key body having a key surface; and an elastic element disposed around the circumference of the key body and having a side surface, wherein the key surface of the key body and the side surface of the elastic element constitute a pressing surface, and the key surface of the key body and the side surface of the elastic element are coplanar, wherein the key module is disposed in the casing, and the pressing surface is exposed from the casing, and wherein the pressing surface protrudes substantially from the surface of the casing or the pressing surface is substantially sunken from the surface of the casing.

2. The key module of claim 1, wherein the elastic element is made of an elastic material.

3. The key module of claim 2, wherein the elastic material is a polymer material.

4. The key module of claim 3, wherein the polymer material is a crude rubber or a synthetic rubber.

5. The key module of claim 1, wherein the key body and the elastic element are connected by adhering or wedging.

6. The key module of claim 1, wherein the key body has a groove and the elastic element has a protrusion corresponding to the groove.

7. The key module of claim 1, wherein the key body has a protrusion and the elastic element has a groove corresponding to the protrusion.

8. The key module of claim 1, wherein the key module is a power key module.

9. The key module of claim 1, wherein the key module is a reset key module.

10. The key module of claim 1, wherein the electronic device is a portable electronic device.

11. The key module of claim 10, wherein the portable electronic device is a mobile phone, a notebook computer or a personal digital assistant (PDA).

12. The key module of claim 1, wherein the pressing surface and the surface of the casing are substantially coplanar.

13. The key module of claim 1, wherein the casing has a hole for allowing the key body to pass through.

14. The key module of claim 1, wherein the casing has a hole for allowing the key body and the elastic element to pass through.

* * * * *